US012565768B2

(12) United States Patent
Yashar et al.

(10) Patent No.: US 12,565,768 B2
(45) Date of Patent: Mar. 3, 2026

(54) WALL STRUCTURES OF EXTRUDABLE BUILDING MATERIAL

(71) Applicant: ICON Technology, Inc., Austin, TX (US)

(72) Inventors: Melodie Yashar, Austin, TX (US); Ian Bungane Mehlomakulu, Austin, TX (US); Samuel B. Covey, Austin, TX (US)

(73) Assignee: ICON Technology, Inc., Austin, TX (US)

( * ) Notice: Subject to any disclaimer, the term of this patent is extended or adjusted under 35 U.S.C. 154(b) by 221 days.

(21) Appl. No.: 18/204,295

(22) Filed: May 31, 2023

(65) Prior Publication Data

US 2024/0141641 A1 May 2, 2024

Related U.S. Application Data

(60) Provisional application No. 63/347,129, filed on May 31, 2022, provisional application No. 63/347,130, filed on May 31, 2022.

(51) Int. Cl.
*E04B 1/16* (2006.01)
*B28B 1/00* (2006.01)
(Continued)

(52) U.S. Cl.
CPC .......... *E04B 1/165* (2013.01); *B28B 17/0081* (2013.01); *E04B 1/04* (2013.01); *E04B 1/7608* (2013.01); *E04B 2/789* (2013.01); *E04C 5/0618* (2013.01); *E04G 21/02* (2013.01); *E04G 21/14* (2013.01); *B28B 1/001* (2013.01); *B33Y 10/00* (2014.12); *B33Y 40/00* (2014.12);
(Continued)

(58) Field of Classification Search
CPC .......... E04B 1/165; E04B 1/04; E04B 1/7608; E04B 2/789; E04B 2/7403; E04B 2/828; E04B 1/35; E04C 5/0618; E04G 21/02; E04G 21/14; E04G 21/0463
See application file for complete search history.

(56) References Cited

U.S. PATENT DOCUMENTS

| | | | | |
|---|---|---|---|---|
| 7,153,454 | B2 * | 12/2006 | Khoshnevis | .......... B29C 64/118 425/375 |
| 7,452,196 | B2 * | 11/2008 | Khoshnevis | ............ B28B 1/001 425/114 |

(Continued)

FOREIGN PATENT DOCUMENTS

| | | | |
|---|---|---|---|
| CN | 204738415 U | * | 11/2015 |
| RU | 2728081 C1 | * | 7/2020 |

OTHER PUBLICATIONS

Search Report and Written Opinion for PCT/US2023/024068 (10 pages). (Year: 2023).*

*Primary Examiner* — Rodney Mintz
(74) *Attorney, Agent, or Firm* — KOKKA & BACKUS, PC

(57) ABSTRACT

Techniques for and examples of a partition wall structure of a building are described, including a first shell formed as a first wythe including a first group of stacked elongated beads of extruded building material, a second shell spaced apart from the first shell and formed as a second wythe that has a second group of stacked elongated beads of extruded building material, and at least one structural support having a first portion embedded in the first wythe, and a second portion embedded in the second wythe.

17 Claims, 5 Drawing Sheets

(51) Int. Cl.

| | |
|---|---|
| *B28B 17/00* | (2006.01) |
| *B33Y 10/00* | (2015.01) |
| *B33Y 40/00* | (2020.01) |
| *B33Y 80/00* | (2015.01) |
| *E04B 1/04* | (2006.01) |
| *E04B 1/76* | (2006.01) |
| *E04B 2/74* | (2006.01) |
| *E04B 2/78* | (2006.01) |
| *E04B 2/82* | (2006.01) |
| *E04C 5/06* | (2006.01) |
| *E04G 21/02* | (2006.01) |
| *E04G 21/14* | (2006.01) |

(52) U.S. Cl.
CPC ............. *B33Y 80/00* (2014.12); *E04B 2/7403* (2013.01); *E04B 2/828* (2013.01)

(56) References Cited

U.S. PATENT DOCUMENTS

| | | | | |
|---|---|---|---|---|
| 7,641,461 | B2 * | 1/2010 | Khoshnevis | E04G 21/0463 |
| | | | | 425/375 |
| 7,837,378 | B2 * | 11/2010 | Khoshnevis | E04G 11/34 |
| | | | | 366/139 |
| 7,874,825 | B2 * | 1/2011 | Khoshnevis | B29C 48/06 |
| | | | | 425/114 |
| 7,878,789 | B2 * | 2/2011 | Khoshnevis | B28B 1/16 |
| | | | | 425/461 |
| 8,029,258 | B2 * | 10/2011 | Khoshnevis | B29C 64/106 |
| | | | | 425/114 |
| 8,518,308 | B2 * | 8/2013 | Khoshnevis | E04G 21/0463 |
| | | | | 425/114 |
| 10,074,449 | B2 * | 9/2018 | White | H05K 9/0001 |
| 10,260,251 | B2 * | 4/2019 | Rao Vemuri | E04C 5/161 |
| 10,378,208 | B2 * | 8/2019 | Sun | E04C 3/34 |
| 10,837,173 | B2 * | 11/2020 | Yin | E04B 1/04 |
| 10,851,538 | B2 * | 12/2020 | Le Roux | E04B 1/34823 |
| 10,870,217 | B2 * | 12/2020 | Gerbut | B33Y 10/00 |
| 10,968,653 | B2 * | 4/2021 | Vemuri | E04H 9/025 |
| 11,124,961 | B2 * | 9/2021 | Crump | B28B 3/20 |
| 11,179,927 | B2 * | 11/2021 | Ford | B33Y 10/00 |
| 11,293,181 | B2 * | 4/2022 | Ma | E04C 2/288 |
| 11,408,166 | B2 * | 8/2022 | Le Roux | B28B 1/001 |
| 11,572,692 | B2 * | 2/2023 | Covey | B33Y 10/00 |
| 11,578,488 | B2 * | 2/2023 | Ma | E04C 2/288 |
| 11,761,195 | B2 * | 9/2023 | Le Roux | B28B 3/20 |
| | | | | 425/62 |
| 11,787,082 | B2 * | 10/2023 | Mayer | B33Y 70/00 |
| | | | | 264/401 |
| 12,017,954 | B2 * | 6/2024 | Kupwade-Patil | B33Y 70/10 |
| 12,076,883 | B2 * | 9/2024 | Mayer | B33Y 10/00 |
| 12,103,232 | B2 * | 10/2024 | Wu | E04G 21/0463 |
| 12,226,930 | B2 * | 2/2025 | Gouwy | E04C 3/30 |
| 2004/0164436 | A1 * | 8/2004 | Khoshnevis | B29C 64/106 |
| | | | | 425/463 |
| 2005/0194401 | A1 * | 9/2005 | Khoshnevis | B28B 1/001 |
| | | | | 222/100 |
| 2005/0196482 | A1 * | 9/2005 | Khoshnevis | E04G 11/34 |
| | | | | 425/207 |
| 2005/0196484 | A1 * | 9/2005 | Khoshnevis | B28B 1/001 |
| | | | | 425/463 |
| 2007/0138678 | A1 * | 6/2007 | Khoshnevis | B29C 48/06 |
| | | | | 52/561 |
| 2009/0043424 | A1 * | 2/2009 | Khoshnevis | B33Y 30/00 |
| | | | | 901/43 |
| 2010/0112119 | A1 * | 5/2010 | Khoshnevis | B29C 48/14 |
| | | | | 425/432 |
| 2010/0318222 | A1 * | 12/2010 | Khoshnevis | E04G 21/0463 |
| | | | | 700/245 |
| 2012/0038074 | A1 * | 2/2012 | Khoshnevis | E04G 21/0463 |
| | | | | 264/34 |
| 2017/0203468 | A1 * | 7/2017 | Sherman | E04G 21/0445 |
| 2017/0365365 | A1 * | 12/2017 | White | H05K 9/0001 |
| 2018/0093373 | A1 * | 4/2018 | Niederberger | B33Y 30/00 |
| 2018/0100322 | A1 * | 4/2018 | Rao Vemuri | E04H 9/025 |
| 2018/0305929 | A1 * | 10/2018 | Sun | E01D 19/02 |
| 2018/0311863 | A1 * | 11/2018 | Gerbut | B33Y 70/00 |
| 2019/0226206 | A1 * | 7/2019 | Yin | E04B 1/215 |
| 2019/0226210 | A1 * | 7/2019 | Yin | E04C 3/294 |
| 2019/0301194 | A1 * | 10/2019 | Vemuri | E04C 5/0604 |
| 2019/0338518 | A1 * | 11/2019 | Ma | E04C 2/288 |
| 2020/0149269 | A1 * | 5/2020 | Crump | D04B 1/00 |
| 2020/0198318 | A1 * | 6/2020 | Ford | B29C 64/153 |
| 2020/0199862 | A1 * | 6/2020 | Le Roux | E04G 21/0427 |
| 2020/0269463 | A1 * | 8/2020 | Mayer | E04C 3/20 |
| 2020/0284025 | A1 * | 9/2020 | Le Roux | B33Y 50/02 |
| 2021/0040724 | A1 * | 2/2021 | Le Roux | E04B 1/35 |
| 2021/0129377 | A1 * | 5/2021 | Mo | B28B 1/522 |
| 2021/0370546 | A1 * | 12/2021 | Mayer | E04G 21/0463 |
| 2022/0034088 | A1 * | 2/2022 | Covey | E04B 2/84 |
| 2022/0081360 | A1 * | 3/2022 | Kupwade-Patil | B33Y 10/00 |
| 2022/0106790 | A1 * | 4/2022 | Ma | E04C 2/288 |
| 2022/0235543 | A1 * | 7/2022 | Le Roux | B29C 64/227 |
| 2022/0268039 | A1 * | 8/2022 | Ford | G06F 30/17 |
| 2023/0055418 | A1 * | 2/2023 | Wu | B29C 64/209 |
| 2023/0061766 | A1 * | 3/2023 | Gouwy | B32B 15/18 |
| 2023/0094390 | A1 * | 3/2023 | Gouwy | B28B 3/20 |
| | | | | 428/294.7 |
| 2023/0150168 | A1 * | 5/2023 | Gouwy | B28B 23/02 |
| | | | | 428/457 |
| 2023/0330891 | A1 * | 10/2023 | Mo | B22F 10/18 |
| 2023/0349148 | A1 * | 11/2023 | Droge | E04G 21/12 |
| 2023/0349176 | A1 * | 11/2023 | Timlick | E04G 21/0427 |
| 2023/0392365 | A1 * | 12/2023 | Yashar | E04G 21/14 |
| 2024/0011288 | A1 * | 1/2024 | Covey | E04G 21/0436 |
| 2024/0044157 | A1 * | 2/2024 | Yashar | E04B 1/165 |
| 2024/0052653 | A1 * | 2/2024 | Yashar | E04G 21/0463 |
| 2024/0139996 | A1 * | 5/2024 | Mayer | E04G 21/0463 |
| 2024/0151050 | A1 * | 5/2024 | Mehlomakulu | B28B 1/001 |
| 2024/0391136 | A1 * | 11/2024 | Mayer | B33Y 10/00 |

* cited by examiner

1

WALL STRUCTURES OF EXTRUDABLE BUILDING MATERIAL

CROSS-REFERENCE TO RELATED APPLICATION

This nonprovisional patent application claims the benefit of U.S. Provisional Patent Application No. 63/347,129, filed on May 31, 2022 and titled, "WALL STRUCTURES OF EXTRUDABLE BUILDING MATERIAL," this application also claims the benefit of U.S. Provisional Patent Application No. 63/347,130, filed May 31, 2022 and titled, "WALL STRUCTURES OF EXTRUDABLE BUILDING MATERIAL," all of which are herein incorporated by reference in their entirety for all purposes.

FIELD

The present disclosure describes three-dimensional printing of building structures. More particular, this disclosure is directed to printing of stacked layers of extrudable building material to form a wall structure of the building.

BACKGROUND

A building structure (e.g., building, dwelling, shed, home, etc.) may be constructed with a multitude of different materials and construction methods. Among the materials commonly used in the construction of a building structure is concrete or cement. For example, cementitious material may be mixed with water and other dry ingredients to form the foundation and the interior or exterior walls of the building.

SUMMARY

In an example implementation, a partition wall structure of a building includes a first shell formed as a first wythe that includes a first plurality of stacked elongated beads of extruded building material; a second shell spaced apart from the first shell and formed as a second wythe that includes a second plurality of stacked elongated beads of extruded building material; and at least one structural support. The at least one structural support includes a first portion embedded in the first wythe; and a second portion embedded in the second wythe.

In an aspect combinable with the example implementation, a thickness of the first wythe is a single bead width of the first plurality of stacked elongated beads.

In another aspect combinable with any of the previous aspects, a thickness of the second wythe is a single bead width of the second plurality of stacked elongated beads.

Another aspect combinable with any of the previous aspects further includes at least one structural rod positioned between the first wythe and the second wythe.

In another aspect combinable with any of the previous aspects, the at least one structural rod is vertically positioned in a space between the first and second wythes.

In another aspect combinable with any of the previous aspects, the at least one structural rod includes at least one tensioned coil rod.

In another aspect combinable with any of the previous aspects, the first portion is embedded within at least one of the first plurality of stacked elongated beads.

In another aspect combinable with any of the previous aspects, the second portion is embedded within at least one of the second plurality of stacked elongated beads.

In another aspect combinable with any of the previous aspects, the first portion is positioned between two adjacent, stacked elongated beads of the first plurality of stacked elongated beads.

In another aspect combinable with any of the previous aspects, the second portion is positioned between two adjacent, stacked elongated beads of the second plurality of stacked elongated beads.

In another aspect combinable with any of the previous aspects, the at least one structural support includes a U-shaped structural support.

In another aspect combinable with any of the previous aspects, the first portion forms a first leg of the U-shaped structural support, and the second portion forms a second leg of the U-shaped structural support that is connected to the first leg.

In another aspect combinable with any of the previous aspects, the at least one structural support includes a first structural support, the partition wall structure further including a second structural support.

In another aspect combinable with any of the previous aspects, the second structural support is wholly positioned in one of the first or second wythes.

In another aspect combinable with any of the previous aspects, the second structural support is wholly embedded within at least one of the first plurality of stacked elongated beads; or within at least one of the second plurality of stacked elongated beads.

In another aspect combinable with any of the previous aspects, the second structural support is wholly positioned between two adjacent, stacked elongated beads of the first plurality of stacked elongated beads; or between two adjacent, stacked elongated beads of the second plurality of stacked elongated beads.

In another aspect combinable with any of the previous aspects, the second structural support is substantially linear.

In another aspect combinable with any of the previous aspects, the second wythe is spaced about 3 inches apart from the first wythe.

In another aspect combinable with any of the previous aspects, at least one of the first or second wythes is about 2.5 inches in width.

Another aspect combinable with any of the previous aspects further includes one or more top plates that is secured to at least one of the first plurality of stacked elongated beads of extruded building material and at least one of the second plurality of stacked elongated beads of extruded building material.

Another aspect combinable with any of the previous aspects further includes a sound deadening material positioned between the first wythe and the second wythe.

In another aspect combinable with any of the previous aspects, the partition wall structure is a non-load-bearing wall structure.

In another example implementation, a method of forming a partition wall structure of a building includes forming, with a three-dimensional (3D) printing system, a first portion of a first shell with a first wythe that includes a first plurality of stacked elongated beads of an extrudable building material; forming, with the 3D printing system, a first portion of a second shell with a second wythe that includes a second plurality of stacked elongated beads of the extrudable building material and is spaced apart from the first wythe; and installing at least one structural support that includes a first portion positioned in the first wythe and a second portion positioned in the second wythe.

In an aspect combinable with the example implementation, a thickness of the first wythe is a single bead width of the first plurality of stacked elongated beads.

In another aspect combinable with any of the previous aspects, a thickness of the second wythe is a single bead width of the second plurality of stacked elongated beads.

Another aspect combinable with any of the previous aspects further includes positioning at least one structural rod between the first wythe and the second wythe.

Another aspect combinable with any of the previous aspects further includes positioning the at least one structural rod vertically in a space between the first and second wythes.

In another aspect combinable with any of the previous aspects, the at least one structural rod includes at least one tensioned coil rod.

Another aspect combinable with any of the previous aspects further includes embedding the first portion within at least one of the first plurality of stacked elongated beads.

Another aspect combinable with any of the previous aspects further includes embedding the second portion within at least one of the second plurality of stacked elongated beads.

Another aspect combinable with any of the previous aspects further includes positioning the first portion between two adjacent, stacked elongated beads of the first plurality of stacked elongated beads.

Another aspect combinable with any of the previous aspects further includes positioning the second portion between two adjacent, stacked elongated beads of the second plurality of stacked elongated beads.

In another aspect combinable with any of the previous aspects, the at least one structural support includes a U-shaped structural support.

In another aspect combinable with any of the previous aspects, the first portion forms a first leg of the U-shaped structural support, and the second portion forms a second leg of the U-shaped structural support that is connected to the first leg.

In another aspect combinable with any of the previous aspects, the at least one structural support includes a first structural support, the method further including installing at least one second structural support.

In another aspect combinable with any of the previous aspects, installing the at least one second structural support includes positioning the at least one second structural support wholly within one of the first or second wythes.

Another aspect combinable with any of the previous aspects further includes wholly embedding the second structural support within at least one of the first plurality of stacked elongated beads; or within at least one of the second plurality of stacked elongated beads.

In another aspect combinable with any of the previous aspects, the second structural support is wholly positioned between two adjacent, stacked elongated beads of the first plurality of stacked elongated beads; or between two adjacent, stacked elongated beads of the second plurality of stacked elongated beads.

In another aspect combinable with any of the previous aspects, the second structural support is substantially linear.

In another aspect combinable with any of the previous aspects, the second wythe is spaced about 3 inches apart from the first wythe.

In another aspect combinable with any of the previous aspects, at least one of the first or second wythes is about 2.5 inches in width.

Another aspect combinable with any of the previous aspects further includes installing one or more top plates to at least one of the first plurality of stacked elongated beads of extruded building material and at least one of the second plurality of stacked elongated beads of extruded building material.

Another aspect combinable with any of the previous aspects further includes installing a sound deadening material in a space between the first wythe and the second wythe.

In another aspect combinable with any of the previous aspects, the partition wall structure is a non-load-bearing wall structure.

Another aspect combinable with any of the previous aspects further includes, subsequent to the installation of the at least one structural support forming, with the 3D printing system, a second portion of the first wythe of the partition wall structure that includes a third plurality of stacked elongated beads of the extrudable building material; and forming, with the 3D printing system, a second portion of the second wythe of the partition wall structure that includes a fourth plurality of stacked elongated beads of the extrudable building material and is spaced apart from the first wythe.

Implementations of systems and methods for a wall structure according to the present disclosure can include one, some, or all of the following features. For example, a wall structure according to the present disclosure can be constructed by a 3D printing system/process to form an interior or exterior, non-load-bearing wall structure in a more efficient manner than conventional building processes. As another example, a wall structure according to the present disclosure can be constructed by a 3D printing system/process to form a non-load-bearing wall structure that includes single-wythe shells. As another example, a wall structure according to the present disclosure can be constructed by a 3D printing system/process to form an interior, non-load bearing wall structure by using less extrudable material than otherwise would be required.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Building structures (e.g., dwellings, buildings, sheds, etc.) may be constructed with a multitude of different materials and construction methods. Traditionally, a building structure may be constructed upon a composite slab or foundation that comprises concrete reinforced with re-bar or other metallic materials. The structure itself may then be framed (e.g., with wood and/or metal framing members), and then an outer shell and interior coverings (e.g., ply-wood, sheet rock, etc.) may be constructed around the structural framing. Utilities (e.g., water and electrical power delivery as well as vents and ducting for air conditioning and heating systems) may be enclosed within the outer shell and interior covers along with insulation. This method of designing and constructing a building structure is well known and has been successfully utilized in constructing an uncountable number of buildings; however, it requires multiple constructions steps that cannot be performed simultaneously and that often require different skills and trades to complete. As a result, this process for designing and constructing a building can extend over a considerable period (e.g., 6 months to a year or more) and is somewhat labor-intensive. Such a lengthy construction period is not desirable in circumstances that call for the inexpensive construction of a structure in a relatively short period of time.

Accordingly, embodiments disclosed herein include construction systems, methods of construction, and even methods for structure design that allow a building structure to be constructed in a fraction of the time associated with traditional construction methods. In particular, embodiments disclosed herein utilize additive manufacturing techniques (e.g., three dimensional (3D) printing) in order to produce a building more quickly, economically, and in a systematic manner. Three dimensional printing generally involves movement of a printing assembly, and a nozzle outlet of the printing assembly, in three axes of movement across a horizontal surface of a wall structure comprising inner and outer members. The wall structure is therefore built layer-by-layer from the ground or foundation upward. As the wall is being built, or printed, the nozzle will periodically turn off and extruded building material will cease exiting the outlet to leave openings in the wall for the windows, doors, etc.

Figure 1:
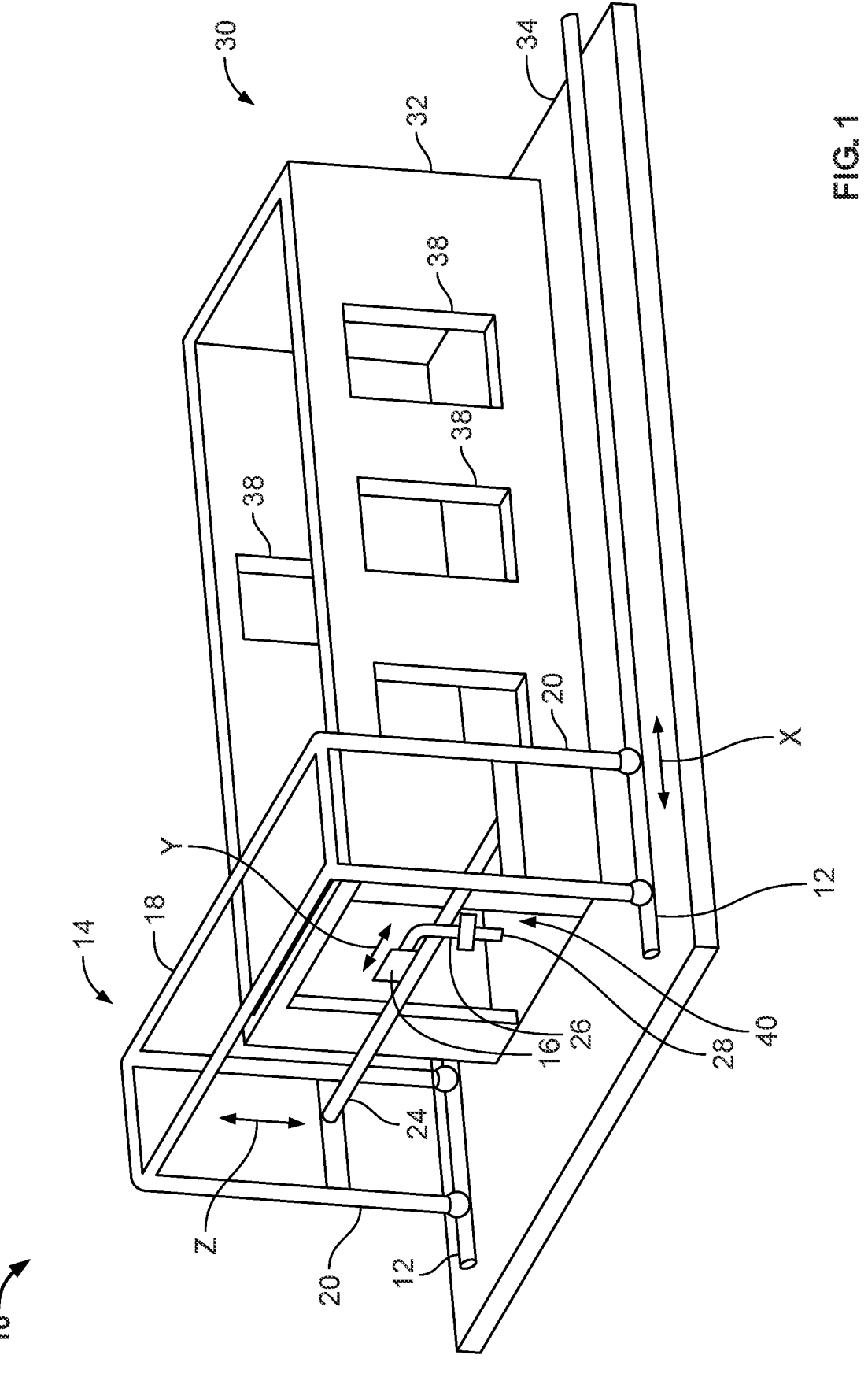
FIG. 1 is a perspective view of a three-dimensional (3D) construction system and a building structure being formed by the 3D construction system using printed, stacked layers of elongated beads according to the present disclosure.

FIG. 1 is a perspective view of a construction system and a building structure being formed by the construction system using printed, stacked layers of elongated beads according to the present disclosure. Referring to FIG. 1, a construction system 10 according to one embodiment is shown. Although there are multiple types of 3D additive construction systems contemplated herein, one example of a construction system 10 includes a gantry-type construction system. Other example construction systems can include a single tower and boom to deliver stacked layers of elongated beads onto an existing surface (e.g., a slab or foundation).

Construction system 10 can include a pair of railed assemblies 12, a gantry 14 moveably disposed on rail assemblies 12, and a printing assembly 16 moveably disposed on gantry 14. For example, gantry 14 can include a bridge support 18 connected between a pair of vertical supports 20. Also, coupled between vertical supports can be a trolly bridge 24, on which printing assembly is 16 moveably disposed.

For example, gantry 14 can move in the y-axis or y direction along rail assemblies 12, and printing assembly 16 can move along the x-axis or x direction along trolly bridge 24. To complete the three orthogonal axes or dimensions of movement for printing assembly 16, trolly bridge 24 can move vertically up and down along the z-axis. For example, trolly bridge 24 can move up and down in the z-axis upon the vertical support members 20. The x-axis is orthogonal to the y-axis and the z-axis is orthogonal to the plane formed by the x and y axes. Movement along the x, y and z-axes of printing assembly 16 can occur via drive motors coupled to drive belts, chains, cables, etc., controllably from an instruction-driven processor within a peer system or controller.

Construction system 10 effectuates the construction of a building structure 30 by passing the printing assembly 16 above a wall structure 32 and emitting extruded building material from a nozzle 26 comprising an outlet 28. Accordingly, as printing assembly 16 moves in three possible orthogonal axis, as well as angles there between, outlet 28 emits extruded building material onto the upper surface of the wall structure 32 as it is being formed. The wall structure is formed layer-by-layer by laying down an elongated bead of cementitious material of cement or concrete beginning with the first layer on ground or a pre-existing foundation 34.

As each layer of elongated beads are laid down onto the foundation 34 or onto a previous layer, a plurality of stacked elongated beads of extruded building material additively, and three dimensions, form a building structure 30. When the printing assembly 16, and thereby the outlet 28 approaches an opening, such as a window opening 38, or a door opening 40, the pump for the extruded building material stops, and possibly a valve on outlet 28, or elsewhere, shuts off the flow of extruded material, and does not resume the flow until after the outlet 28 moves past the opening where the wall structure 32 is resumed.

Foundation 34 can be made of concrete with metallic rods (e.g., rebar) within the foundation form. Alternatively, foundation 34 can simply be ground, possibly packed gravel or crushed rock, a 3D printed form work, foundation, or otherwise. In some aspects, however, foundation 34 upper surface should be substantially planar at its top surface and of sufficient perimeter size to accommodate 3D printing of wall structure 32 thereon. The axis, labeled as x, y and z are orthogonal axis in three dimensions; however, it is contemplated that printing assembly 16 and thus outlet 28 can move in three dimensions to form a wall structure at various three-dimensional angles that can be but need not be orthogonal angles for the wall structure 32.

In this example implementation, FIG. 1 shows an interior (or inner) wall structure 32 that can be used to bifurcate rooms of a building 30 using the construction system 10. For example, in some aspects, the interior wall structure 32 can have a first shell and a second shell (each defined by a wythe of stacked elongated beads), with both the first and second shells only exposed to a human-occupiable, indoor, temperature-controlled environment. Thus, in some aspects, neither sides of interior wall structure 32 are exposed (as designed) to an outdoor ambient environment. However, in alternative embodiments, the wall structure 32 can be an exterior wall structure, such that with the first shell is exposed (e.g., solely) to a human-occupiable, indoor, temperature-controlled environment and the second shell is exposed (e.g., solely) to an outdoor, ambient environment.

In some aspects, both the first and second shells can be exposed to an outdoor, ambient environment.

The wall structure 32, in some aspects, can form at least a portion of a non-load bearing wall (also referred to as a "partition wall" or "partition wall structure" in the present disclosure). For example, in some aspects, the wall structure 32, when fully formed and cured, is sufficient to bear its own weight (e.g., holds itself upright, as well as appurtenances such as door frames, window frames, and household items fastened to the structure) but is insufficient to bear (without deformation or collapse or other movement) loads (e.g., on a top surface of the structure 32 with respect to gravity) including but not limited to compressive, flexural, shear, and uplift onto the wall structure 32. For example, the wall structure 32 may not be capable of bearing the load of a ceiling structure in the building or a roof in which the wall structure 32 is constructed.

As used herein, a ceiling structure can be a planar or angular structure that separates a human-occupiable, indoor, temperature-controlled environment from another indoor, temperature-uncontrolled environment (e.g., an attic or crawlspace). As another example, as used herein, a ceiling structure can be a planar or angular structure that separates a human-occupiable, indoor, temperature-controlled environment from another indoor, temperature-controlled environment (e.g., a separate floor of a multi-floor building). However, a ceiling structure does not include a roof that separates a human-occupiable, indoor, temperature-controlled (or uncontrolled) environment from an outdoor ambient environment. Thus, the wall structure 32 can be a partition wall structure in that it is insufficient to bear the weight of all or part of a roof structure.

Figures 2, 3:
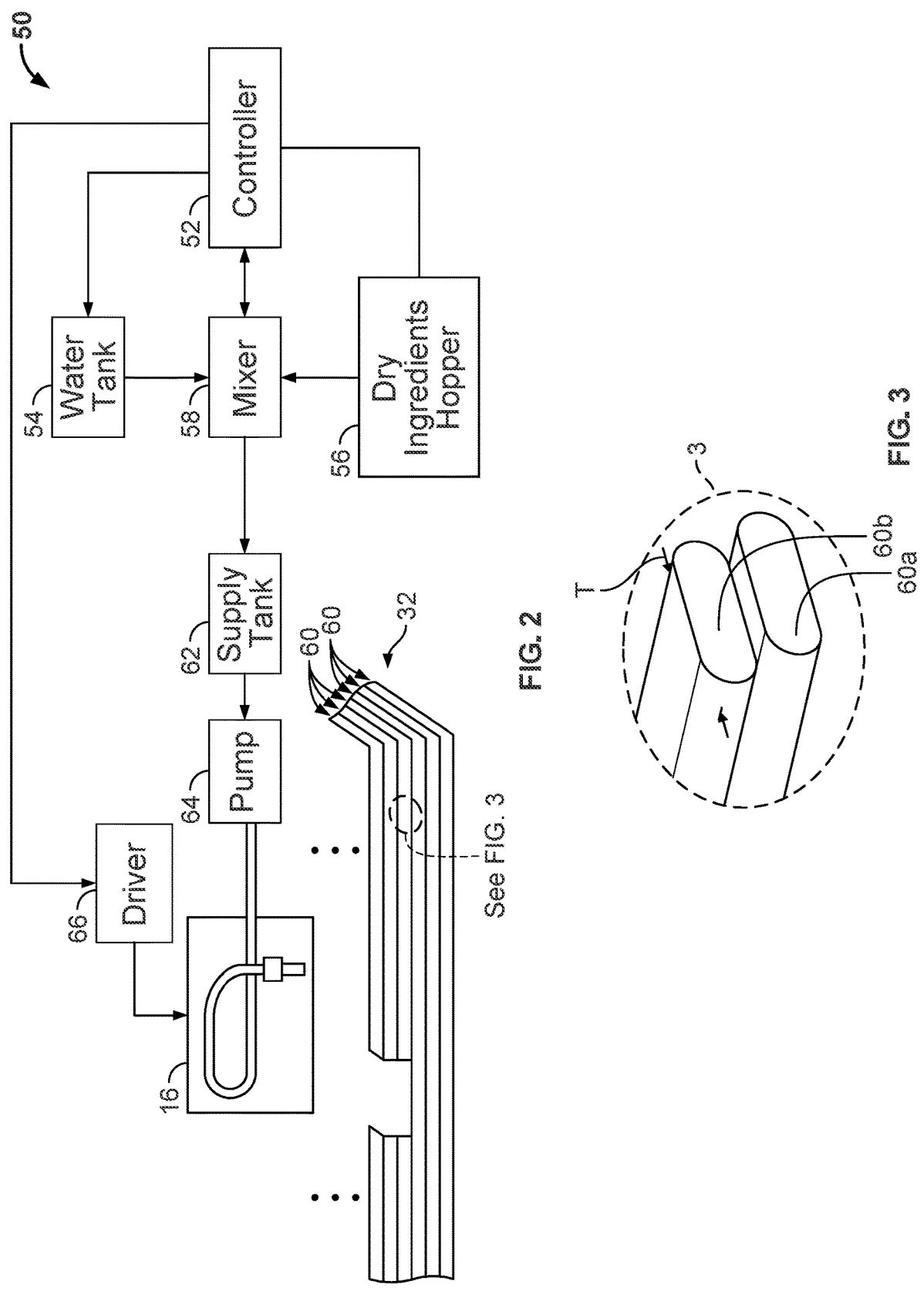
FIG. 2 is a partial front view of the structure, and a block diagram of a control system for controlling the printing of stacked beads that form a wall structure according to the present disclosure.
FIG. 3 is an expanded breakaway view along region 3 of FIG. 2, showing the elongated beads of the wall structure that, when stacked, form one or more wythes of a wall structure according to the present disclosure.

FIG. 2 is a partial front view of the structure, and a block diagram of a control system for controlling the printing of stacked beads that form a wall structure according to the present disclosure. Referring to FIG. 2, a control system 50 is shown in block diagram for controlling the printing of the stacked elongated beads 60 of wall structure 32. Control system 50 includes a computer system, or controller 52, that contains memory and an instruction set for adding the proper amount of water or liquid mix material from water tank 54, and dry ingredients from hopper 56 into mixer 58. Possibly through a feedback sense mechanism, controller can adjust the mix of the concrete material and thus the proper proportions of water (or liquid) to dry material, and supply that proper mix to a supply tank 62.

It is desirable for the stacked elongated beads to be at the proper cross-sectional dimension which is approximately 1.5 to 2.5 inches in lateral width (e.g., parallel to the horizontal plane) and approximately 0.5 to 2 inches tall (e.g., perpendicular to the horizontal plane). The horizontal plane is preferably along a plane formed by the x and y axes, and the orthogonal dimension thereto is preferably along the z-axis or dimension. To maintain the proper cross-sectional dimension in the horizontal plane so that when the elongated beads are stacked, the inner and outer surfaces are relatively even in texture and somewhat smooth. Pump 64 can be used to supply the proper volume of extruded material to supplement the proper viscosity from mixer 58. Controller 52 thereby controls not only the proper flow and viscosity of the elongated bead as it is being printed, one on top of the other, but controller 52 also controls movement of the printing assembly 16 in the x, y and z dimensions via driver 66. The driver can be a motor coupled to any drive mechanism that moves the corresponding trolly bridge 24, gantry 14 and printing assembly on the trolly bridge 24 according to the instruction CAD layout, and to the proper speed, established by the instructions stored in controller 52.

Turning now to FIGS. 2 and 3 in combination, FIG. 3 illustrates an expanded breakaway view along region 3 of FIG. 2. Specifically, FIG. 3 illustrates the elongated beads stacked on top of one another to form a plurality of vertically stacked elongated beads 60. In the example shown, elongated bead 60b is stacked upon elongated bead 60a. As the printing process continues, another elongated bead will be stacked upon bead 60b, and so on. If one bead is stacked upon another bead, then the ensuing wall structure 32 will be one bead width in thickness, labeled T. As noted above, a wythe is a continuous plurality of vertically stacked elongated beads, and a wythe can be a single wythe of thickness T, or a multiple wythe of multiple thicknesses T depending how many elongated beads are placed adjacent one another during the printing process. Accordingly, a wythe is only one bead width in thickness, whereas a pair of wythes is two bead thickness.

Figure 4:
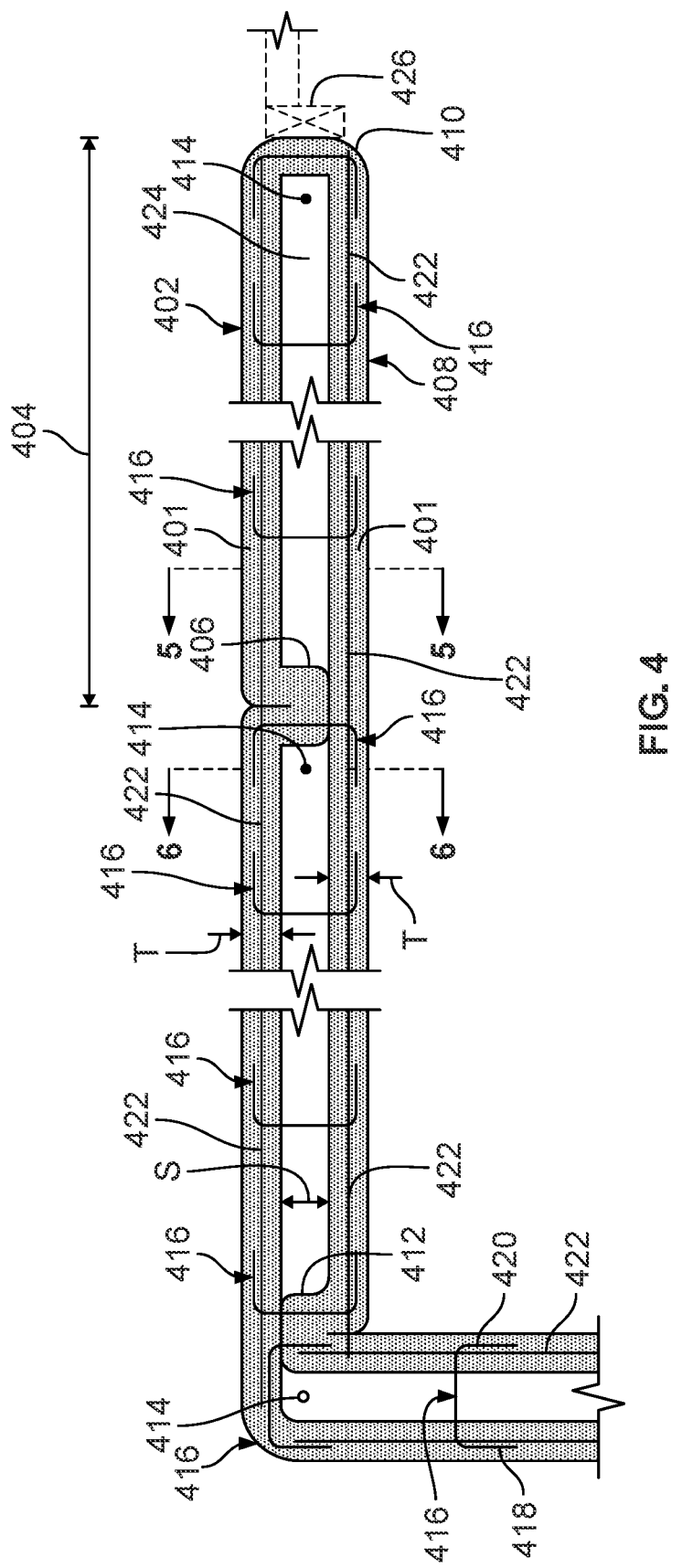
FIG. 4 is a top perspective view of multiple layers of elongated beads of an example implementation of a wall structure according to the present disclosure.

FIG. 4 is a top perspective view of multiple layers of elongated beads of an example implementation of a wall structure according to the present disclosure. For example, at least a portion (e.g., one or more sections) of the wall structure 400 is shown (from a top view) in FIG. 4. In some aspects, wall structure 400 is a non-load-bearing wall structure (e.g., partition wall structure) that can be used as an interior wall structure (such as wall structure 32, e.g., an interior, non-load bearing wall structure or partition wall structure). Thus, like interior wall structure 32, the interior wall structure 400 can comprise multiple, stacked elongated beads of an extrudable building material to form two shells that define opposed, exposed surfaces of the interior wall structure 400.

Figure 5:
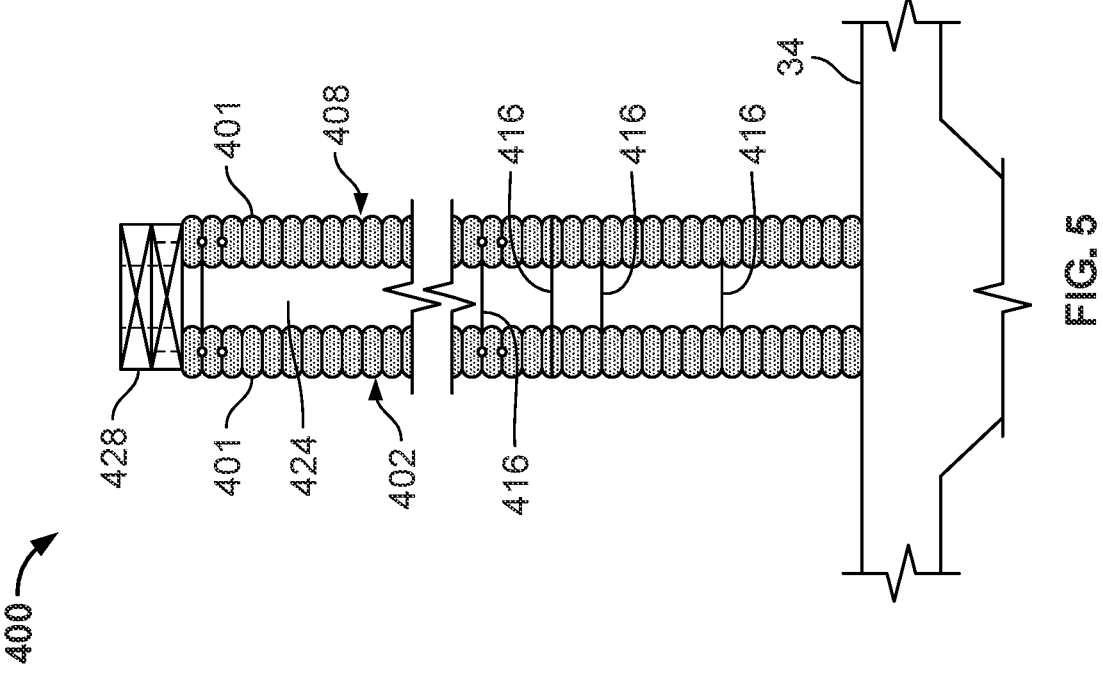
FIG. 5 is an elevation view of a section of an example implementation of a wall structure according to the present disclosure.

For example, as shown, the wall structure 400 includes a first shell 402 (that is formed of a single wythe) that forms a first, exposed surface of the wall structure 400, as well as a second shell 408 (that is formed of a single wythe) that forms a second, exposed surface of the wall structure 400 opposite the first, exposed surface. Each of the first and second shells 402 and 408 are formed, in this example, from multiple layers of a single-width elongated bead 401 of the extrudable building material (as emitted from, e.g., construction system 10) that are stacked to form a wythe. In this example, each of the first and second shells 402 and 408 can be approximately 2.5 inches thick (as indicated by the T in FIG. 4). But alternatively, the first shell 402 can be thicker than the second shell 408, or the first shell 402 can be thinner than the second shell 408. In any event, for most of the wall structure 400, the first and second shells 402 and 408 are spaced apart from each other by a distance, S, as shown in FIG. 5 (which may be approximately 3 inches). In some aspects, the space, S can also be referred to as a core.

As shown in this example, the wall structure 400 can comprise multiple sections 404, formed and joined together to define a whole wall structure 400. In this example, a section 404 can span between a junction 406 of the first shell 402 to an end 410, in which the first and second shells 402 and 408 join to define a termination of the wall structure 400. In this example, the junction 406 is formed by a turn (or multiple turns) of the first shell 402 to span the distance, S, and, in some aspects, contact the second shell 408.

A section 404 can also be defined between two adjacent junctions 406 rather than between a junction 406 and an end 410 (where, e.g., door hardware 426 can be connected). As another example, a section 404 can be defined between a junction 406 (or an end 410) and a corner 412 of the wall structure 400. For instance, as shown, the corner 412 can be formed by an orthogonal turn of the first shell 402 and a turn (or multiple turns) of the second shell 408 to span the distance, S, and, in some aspects, contact the first shell 402.

Figure 6:
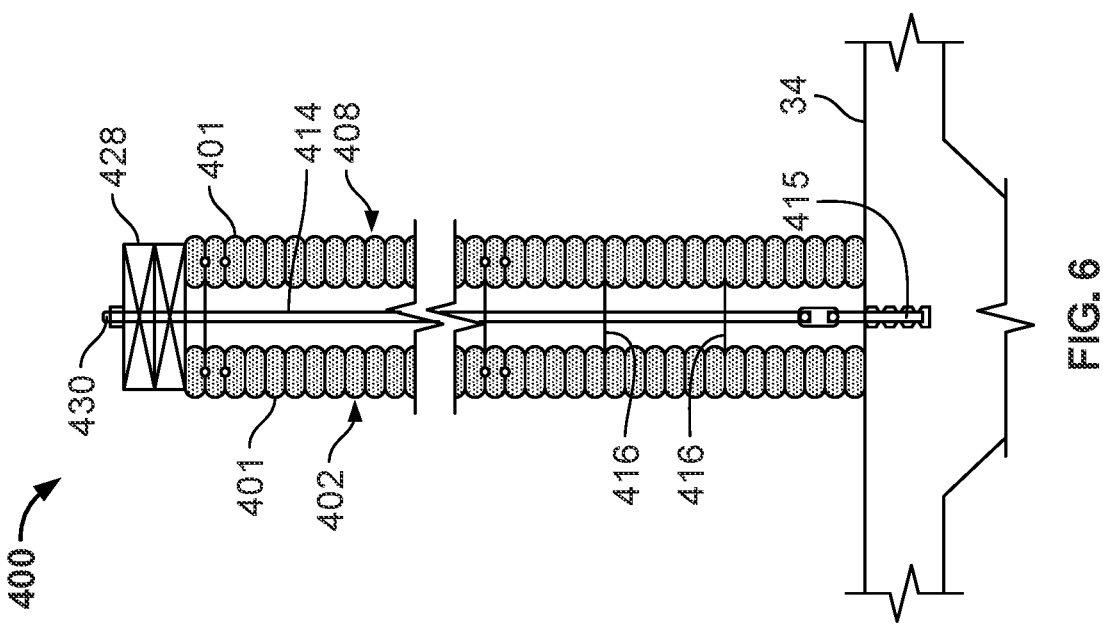
FIG. 6 is another elevation view of a section of an example implementation of a wall structure according to the present disclosure.

As shown in this example implementation of the wall structure 400, one or more vertical structural support rods 414 can be installed within the space, S, between the first and second shells 402 and 408. In some aspects, each of the structural support rods 414 can be installed before initial construction of the wall structure 400, during construction of the wall structure 400, or subsequent to construction of the wall structure 400. Turning briefly to FIG. 6, this figure shows an elevation view of the wall structure 400 at a cross section through one of the structural support rods 414 (as indicated in FIG. 4) that extends vertically through the core of the wall structure 400. As shown in this example, the structural support rod 414 can include an anchor 415 embedded (e.g., secured into) the foundation 34, as well as a connection through one or more top plates 428 (two shown) that are secured (e.g., through the connection 430 and/or other fasteners such as masonry screws or adhesive) to top-most beads 401 of the first and second shells 402 and 408. In some aspects, the structural support rods 414 can be post tensioned coil rods or cable.

As further shown in the example implementation of FIG. 4, the wall structure 400 can include one or more structural supports 416 that span the core (e.g., horizontally in parallel with a foundation) of the wall structure 400 between the first shell 402 and the second shell 408. As shown in this example, each structural support 416 can be U-shaped, with a first leg 418 positioned (e.g., secured) within the first shell 402 and a second leg 420 that is positioned (e.g., secured) within the second shell 408. Thus, along with the top plate(s) 428, the first and second shells 402 and 408 can be structurally secured together with the structural supports 416. Alternatively, the structural support 416 can be another shape, such as Z-, T-, Y-, or other shapes.

Turning briefly to FIG. 5, this figure shows another elevation view of the wall structure 400 at a cross section through the core of the wall structure 400 to show the structural supports 416 that span the space, S. In some aspects, each structural support 416 is installed on top of finished beads 401 of both the first and second shells 402 and 408 (with legs 418 and 420 laid on top of the beads 401). A next or subsequent bead 401 is then installed on both the first and second shells 402 and 408 and over the installed structural supports 416. Thus, in some aspects, each structural support 416 is positioned between two adjacent, stacked elongated beads 401 (for each of the first and second shells 402 and 408). Alternatively, each structural support 416 can be embedded (e.g., manually or otherwise) within a single bead 401 of both of the first and second shells 402 and 408 (i.e., rather than between beads 401). In any event, once the extrudable material of the beads 401 solidifies, the installed structural supports 416 can act to structurally tie the first and second shells 402 and 408 together.

Turning back to FIG. 4, as further shown in this example, stiffeners 422 can be installed within the first and second shells 402 and 408 as shown. In some aspects, the stiffeners 422 can be comprised of straight or linear rigid members (e.g., or steel, aluminum, composite, or otherwise) that provide or help provide rigidity to each wythe. In some examples, each stiffener 422 can be positioned between two adjacent, stacked elongated beads 401 (for each of the first and second shells 402 and 408). Alternatively, each stiffener 422 can be embedded (e.g., manually or otherwise) within a single bead 401 of either of the first and second shells 402 and 408 (i.e., rather than between beads 401).

In some aspects of the wall structure 400, the space, S (or core), can remain hollow in a finished structure 400. For example, as an interior wall structure, thermal insulation may not be needed within the core. However, in some aspects, a filling 424 can be installed in some, most, or all of the core of the wall structure 400. In some aspects, the filling 424 can comprise a sound deadening material (e.g., a material that reduces or limits sound waves from passing through the wall structure 400). In some aspects, the filling 424 can have both sound deadening and thermal insulative properties.

Figure 7:
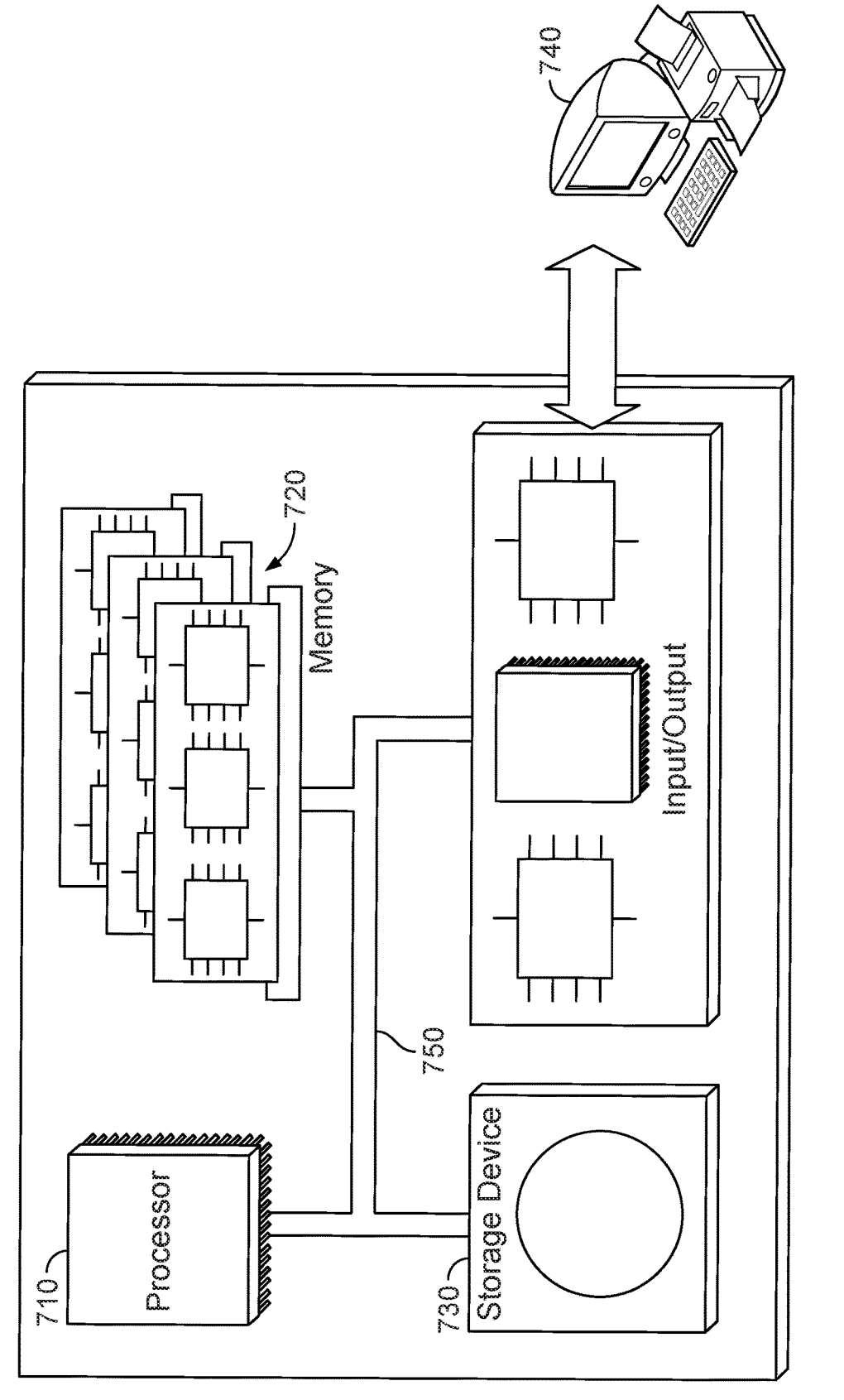
FIG. 7 is a schematic illustration of an example control system for a 3D construction system used to construct a wall structure according to the present disclosure.

FIG. 7 is a schematic illustration of an example control system for a construction system used to construct a wall structure according to the present disclosure. For example, all or parts of the controller 700 can be used for the operations described previously, for example as or as part of the controller 52. The controller 700 is intended to include various forms of digital computers, such as printed circuit boards (PCB), processors, digital circuitry, or otherwise. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 700 includes a processor 710, a memory 720, a storage device 730, and an input/output device 740. Each of the components 710, 720, 730, and 740 are interconnected using a system bus 750. The processor 710 is capable of processing instructions for execution within the controller 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the controller 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the controller 700. In one implementation, the storage device 730 is a computer-readable medium. In various different implementations, the storage device 730 may be a floppy disk device, a hard disk device, an optical disk device, a tape device, flash memory, a solid state device (SSD), or a combination thereof.

The input/output device 740 provides input/output operations for the controller 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

In the following discussion and in the claims, the terms "including" and "comprising" are used in an open-ended fashion, and thus should be interpreted to mean "including, but not limited to . . . ." Also, the term "couple" or "couples"

is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., x, y, or z direction or central axis of a body, outlet or port), while the terms "radial" and "radially" generally mean perpendicular to the given axis. For instance, an axial distance refers to a distance measured along or parallel to the axis, and a radial distance means a distance measured perpendicular to the axis.

As used herein, the terms "about," "approximately," "substantially," "generally," and the like mean plus or minus 10% of the stated value or range. In addition, as used herein, an "extruded building material" refers to a building material that may be delivered or conveyed through a conduit (e.g., such as a flexible conduit) and extruded (e.g., via a nozzle or pipe) in a desired location. In some embodiments, an extruded building material includes a cementitious mixture (e.g., concrete, cement, etc.).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed:

1. A partition wall structure of a building, comprising:
   a first shell formed as a first wythe that comprises a first plurality of stacked elongated beads of extruded building material;

a second shell spaced apart from the first shell and formed as a second wythe that comprises a second plurality of stacked elongated beads of extruded building material;

at least one structural rod positioned between the first wythe and the second wythe; and at least one U-shaped structural support comprising a first portion defining a first leg embedded in the first wythe, and a second portion defining a second leg coupled to the first leg, the second leg embedded in the second wythe and a middle portion spanning a core of the partition wall structure between the first shell and the second shell, the first portion, the second portion, and the middle portion being substantially U-shaped.

2. The partition wall structure of claim 1, wherein a thickness of the first wythe is a single bead width of the first plurality of stacked elongated beads.

3. The partition wall structure of claim 1, wherein a thickness of the first wythe is a single bead width of the first plurality of stacked elongated beads and another thickness of the second wythe is a single bead width of the second plurality of stacked elongated beads.

4. The partition wall structure of claim 1, the at least one structural rod being vertically positioned in a space between the first and second wythes.

5. The partition wall structure of claim 1, the at least one structural rod being vertically positioned in a space between the first and second wythes, the at least one structural rod comprising at least one tensioned coil rod.

6. The partition wall structure of claim 1, the at least one structural rod being vertically positioned in a space between the first and second wythes, the at least one structural rod comprising at least one tensioned coil rod, the first portion being embedded within at least one of the first plurality of stacked elongated beads.

7. The partition wall structure of claim 1, the at least one structural rod being vertically positioned in a space between the first and second wythes, the at least one structural rod comprising at least one tensioned coil rod, the first portion being embedded within at least one of the first plurality of stacked elongated beads, the second portion being embedded within at least one of the second plurality of stacked elongated beads.

8. The partition wall structure of claim 1, wherein the first portion is positioned between two adjacent stacked elongated beads of the first plurality of stacked elongated beads.

9. The partition wall structure of claim 1, wherein the first portion is positioned between two adjacent stacked elongated beads of the first plurality of stacked elongated beads and the second portion is positioned between two adjacent stacked elongated beads of the second plurality of stacked elongated beads.

10. The partition wall structure of claim 1, wherein the at least one structural support comprises a first structural support, the partition wall structure further comprising a second structural support.

11. The partition wall structure of claim 1, wherein the at least one structural support comprises a first structural support, the partition wall structure further comprising a second structural support disposed in the first wythe or the second wythe.

12. The partition wall structure of claim 1, wherein the at least one structural support comprises a first structural support, the partition wall structure further comprising a second structural support disposed in the first wythe or the second wythe, the second structural support being wholly embedded within at least one of the first plurality of stacked elongated beads or the second plurality of stacked elongated beads.

13. The partition wall structure of claim 1, wherein the at least one structural support comprises a first structural support, the partition wall structure further comprising a second structural support disposed in the first wythe or the second wythe, wherein the second structural support is wholly positioned between two or more adjacent stacked elongated beads of the first plurality of stacked elongated beads or between two or more adjacent stacked elongated beads of the second plurality of stacked elongated beads.

14. The partition wall structure of claim 1, wherein the at least one structural support comprises a first structural support, the partition wall structure further comprising a second structural support, the second structural support being substantially linear.

15. The partition wall structure of claim 1, further comprising one or more top plates secured to at least one of the first plurality of stacked elongated beads of extruded building material and at least one of the second plurality of stacked elongated beads of the extruded building material.

16. The partition wall structure of claim 1, further comprising a sound deadening material positioned between the first wythe and the second wythe.

17. The partition wall structure of claim 1, wherein the partition wall structure is a non-load-bearing wall structure.

* * * * *